(12) United States Patent
Huang

(10) Patent No.: US 8,282,216 B2
(45) Date of Patent: Oct. 9, 2012

(54) SINGLE-IMAGER PROJECTION ENGINE ASSEMBLY

(75) Inventor: Herb He Huang, Shanghai (CN)

(73) Assignee: Shanghai Lexvu Opto Microelectronics Technology Co., Ltd., Shanghai (CN)

(*) Notice: Subject to any disclaimer, the term of this patent is extended or adjusted under 35 U.S.C. 154(b) by 369 days.

(21) Appl. No.: 12/683,144

(22) Filed: Jan. 6, 2010

(65) Prior Publication Data

US 2010/0171928 A1 Jul. 8, 2010

Related U.S. Application Data

(60) Provisional application No. 61/142,856, filed on Jan. 6, 2009.

(51) Int. Cl.
*G03B 21/14* (2006.01)
*G03B 21/28* (2006.01)
*G02F 1/1335* (2006.01)
*F21V 9/14* (2006.01)
*H04N 9/69* (2006.01)

(52) U.S. Cl. ............... 353/20; 353/33; 353/84; 353/81; 349/9; 362/19; 348/757

(58) Field of Classification Search ............... 353/20, 353/30, 33, 84, 81; 349/9, 583, 629, 639; 362/19; 348/757
See application file for complete search history.

(56) References Cited

U.S. PATENT DOCUMENTS

2009/0213448 A1* 8/2009 Shen et al. ............... 359/237
2010/0110383 A1* 5/2010 Tang ................... 353/8
* cited by examiner

*Primary Examiner* — Georgia Y Epps
*Assistant Examiner* — Magda Cruz
(74) *Attorney, Agent, or Firm* — J.C. Patents

(57) ABSTRACT

A single-imager projection engine assembly includes a light source, a reflective polarization modulation imager, a reflective quarter wave composite plate, a projection lens system, and a PBS assembly which includes a first polarization beam splitting film and a second polarization beam splitting film in a V-notch pairing configuration. The first polarization beam splitting film reflects the illumination light in first polarization state to the reflective polarization modulation imager, while the second polarization beam splitting film and the reflective quarter wave composite plate in conjunction convert the illumination light in second polarization state passing through the first polarization beam splitting film to first polarization state and reflects the converted to the reflective polarization modulation imager. Combined illumination is modulated, polarization rotated and reflected by the reflective polarization modulation imager back to the PBS assembly for projection through the projection lens.

20 Claims, 5 Drawing Sheets

SINGLE-IMAGER PROJECTION ENGINE ASSEMBLY

CROSS-REFERENCE TO RELATED APPLICATIONS

This application claims priority of provisional application No. 61/142,856, filed on Jan. 6, 2009, entitled "Single-Imager Projection Engine Assembly", which is incorporated herein by reference in its entirety.

FIELD OF THE TECHNOLOGY

The present invention relates to a microdisplay projection system, and more particularly to a microdisplay projection system employing reflective microdisplay imagers and polarizing beam splitter.

BACKGROUND

Microdisplay projection systems typically employ a transmissive or a reflective microdisplay imager, commonly referred to as a light valve or light valve array, which imposes an image on an illumination light beam. One of the important advantages on reflective light valves over transmissive light valves is that reflective light valves permit controlling circuitry to be placed in situ behind the reflective surface, and more advanced integrated circuit technology is available because the substrate materials are not limited by their opaqueness.

A reflective liquid-crystal-on-silicon (LCOS) imager is a kind of reflective microdisplay imager, which rotates and modulates the polarization state of incident light. Thus, polarized light is either reflected by the LCOS imager with its polarization state substantially unmodified, or with a degree of polarization rotation imparted to provide a desired grey scale. Accordingly, a polarized light beam is generally used as the input beam for reflective LCOS imagers, while a polarizing beam-splitter (PBS) is typically employed for splitting the incoming light beam into two polarized light beams in orthogonal polarization states.

Widely used for various portable and handheld projection display applications, a typical single-imager projection engine assembly 500 employs one LCOS reflective polarization modulation imager 110 and one PBS assembly 200a in the simplest but most compact configuration, illustrated in FIG. 1. One of the most obvious drawbacks of this Cartesian optical projection engine single-imager projection engine assembly 500, consisting of the single PBS assembly 200a and the single reflective polarization modulation imager 110, is that only limited portion of illumination light 10 in one polarization state is used for illuminating the reflective polarization modulation imager 110 and therefore, after modulation and reflection by the reflective polarization modulation imager 110, total illumination projected through the projection lens system 300 onto a projection screen 390 is limited. As shown in FIG. 1 in the prior art, the illumination light 10 includes a first polarized illumination light 11 in a first polarization state 1 and a second polarized illumination light 12 in a second polarization state 2 which is orthogonal to the first polarization state 1. Only a main portion of the illumination light 10 in the first polarization state 1 can be utilized while the complimentary portion of the illumination light 10 in the other orthogonal second polarization state 2 is unused for illuminating the reflective polarization modulation imager 110. Similarly, Only the illumination light 10 in the second polarization state 2 can be utilized while the illumination light 10 in the first polarization state 1 can not be utilized. Therefore, a conventional projection engine assembly has low light utilization

SUMMARY

One aspect of the present invention is to provide a single-imager projection engine assembly in order to improve the light utilization of the projection engine assembly.

In an embodiment of the present invention, a single-imager projection engine assembly includes a light source, a reflective polarization modulation imager, a reflective quarter wave composite plate, a projection lens system, and a PBS assembly which includes a first polarization beam splitting film and a second polarization beam splitting film in a V-notch pairing configuration. The first polarization beam splitting film reflects the illumination light in first polarization state to the reflective polarization modulation imager, while the second polarization beam splitting film and the reflective quarter wave composite plate in conjunction convert the illumination light in second polarization state passing through the first polarization beam splitting film to first polarization state and reflects the converted to the reflective polarization modulation imager. Combined illumination is modulated, polarization rotated and reflected by the reflective polarization modulation imager back to the PBS assembly for projection through the projection lens.

Therefore, the present invention using the above projection engine assemble can utilize almost all the light from the light source for purpose of projection so as to greatly improve light utility and projection brightness and lower light consumption cost.

In another embodiment of the present invention, the single-imager projection engine assembly may include a pair of one reflective LCOS microdisplay imager as the reflective polarization modulation imager. Another embodiment may include a micro electrical-mechanical interferometric pixel array device, or Galvanic light valve (GLV) array device with a second transmissive quarter wave plate as the equivalent reflective polarization modulation imager.

In another embodiment of the present invention, the single-imager projection engine assembly may further employ a projection polarization plate placed between the PBS assembly and the projection lens, for further filtering the projection light emitting from the PBS assembly and minimizing the polarization light output in the polarization state orthogonal to the main modulated light towards the projection lens system. The light output from the PBS assembly towards the projection is kept highly polarized at the largest extend from the reflective polarization modulation imager and thus, helps improving image quality of the projected image on a projection screen in contract ratio and brightness uniformity among others.

BRIEF DESCRIPTION OF THE DRAWINGS

The disclosure may be more completely understood in consideration of the following detailed description of various embodiments in connection with the accompanying drawings, in which.

DETAILED DESCRIPTION

Figure 1:
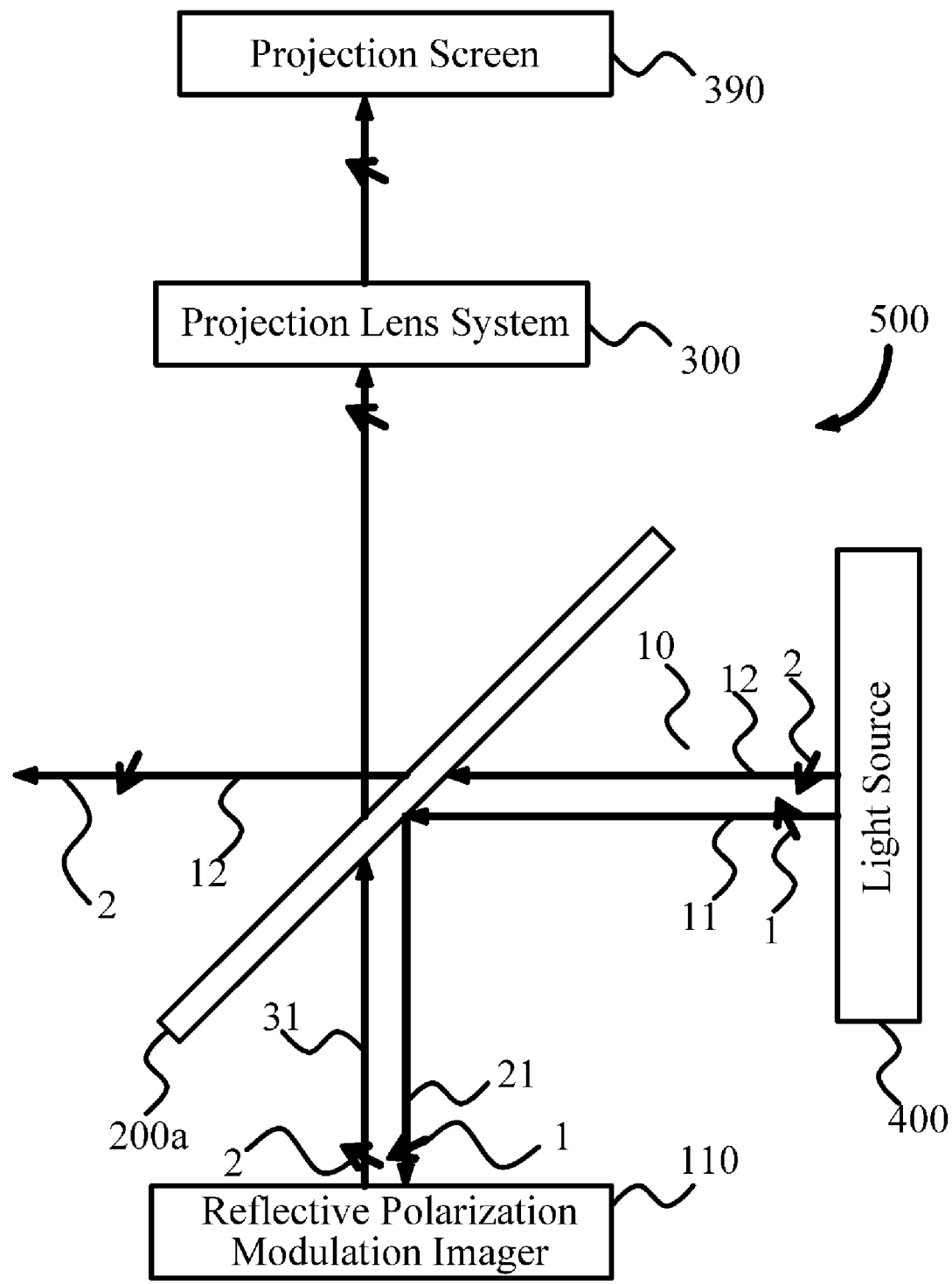
FIG. 1 illustrates an example of a simple compact projection system in the prior art.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the present disclosure.

The present invention may be widely applicable to various microdisplay projection systems. In particular, the present invention relates to an optical projection engine employing a reflective polarization modulation imager, a pair of polarization beam splitting films and a reflective quarter wave composite plate, which jointly provide improved optical performance in projection. While the present invention is not so limited, an appreciation of various aspects of the present invention will be gained through a discussion of the embodiments provided below.

Figure 2:
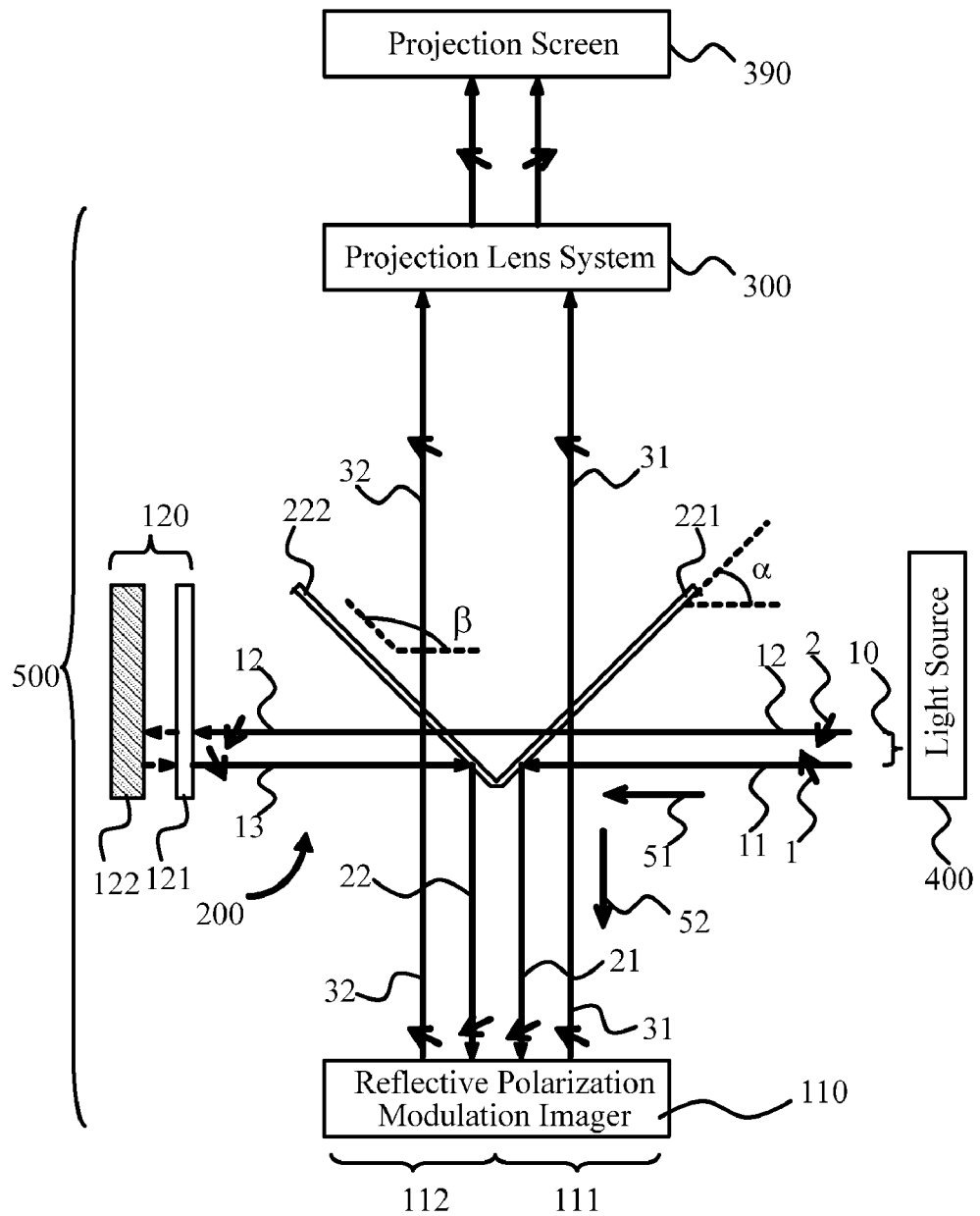
FIG. 2 is a schematic view of the single-imager projection engine assembly provided in Embodiment 1 of the present invention.

FIG. 2 is a schematic view of the single-imager projection engine assembly 500 provided in Embodiment 1 of the present invention. As shown in FIG. 2, the single-imager projection engine assembly 500 includes a light source 400, a reflective polarization modulation imager 110, a first reflective quarter wave composite plate 120, a projection lens system 300, and a PBS assembly 200 which includes a first polarization beam splitting film 221 and a second polarization beam splitting film 222 in a V-notch pairing configuration.

As illustrated in FIG. 2, the light source 400 emits illumination light 10 including a first polarized illumination light 11 in the first polarization state 1 and a second polarized illumination light 12 in the second polarization state 2 orthogonal to the first polarization state 1, towards the PBS assembly 200 along a first direction 51.

The PBS assembly 200 includes a first polarization beam splitting film 221 and a second polarization beam splitting film 222 which are in a V-notch pairing configuration.

The first polarization beam splitting film 221 is configured at a first incident angle α with the first direction 51. The second polarization beam splitting film 222 is configured at a second incident angle β with the first direction 51. The first polarization beam splitting film 221 and the second polarization beam splitting film 222 are both used to reflect illumination light in the first polarization state and to transmit illumination light in the second polarization state.

At the first incident angle α with the first direction 51, the first polarization beam splitting film 221 in the PBS assembly 200 is firstly arranged for receiving illumination light 10 and then for substantially reflecting most or all of the first polarized illumination light 11 in the first polarization state 1 as a first polarization reflected light 21 in the first polarization state 1 in the second direction, and for substantially transmitting most or all of the second polarized illumination light 12 in second polarization state 2.

The first polarization beam splitting film 221 is arranged at the first incident angle α with the first direction 51 for demonstrating a maximum ratio close to one between reflection of the first polarized illumination light 11 in first polarization state 1 to a second direction 52, and transmission of the second polarized illumination light 12 in second polarization state 2 continuously along the first direction 51.

At a second incident angle β, the second polarization beam splitting film 222 is adapted to receive and transmit most or all of the second polarized illumination light 12 in the second polarization state 2 passing through the first polarization beam splitting film 221 so as to make the second polarized illumination light 12 in the second polarization state 2 go toward a reflective quarter wave composite plate 120.

Figure 3:
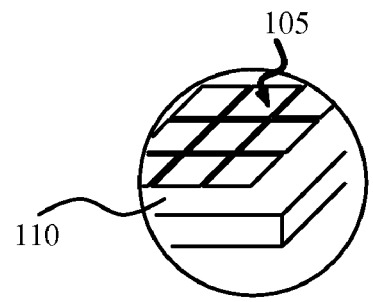
FIG. 3 is a partial cross section view of the reflective polarization modulation imager in FIG. 2.

The reflective polarization modulation imager 110 may be formed by a plurality of modulation imager pixels 105 regularly tiled in a planar array arrangement as shown in FIG. 3. The reflective polarization modulation imager 110 may be constructed with a first half facing area 111 and a second half facing area 112. The first half facing area 111 is aligned with the first polarization beam splitting film 221 for: a) receiving the first polarization reflected light 21 in the second direction 52; b) polarization modulating most or all of the first polarization reflected light 21 from the first polarization state 1 to the second polarization state 2; c) reflecting thus polarization modulated light, as a first modulated light 31 in second polarization state 2, back to the PBS assembly 200. And then the PBS assembly 200 transmits the first modulated light 31 in the second polarization state 2 in opposition to the second direction 52 towards a projection lens system 300.

The first reflective quarter wave composite plate 120, opposite to the light source 400, is arranged for: a) receiving most or all of the second polarized illumination light 12 in second polarization state 2 transmitted first through the first polarization beam splitting film 221 and secondly through the second polarization beam splitting film 222 in the PBS assembly 200 in the first direction 51; b) polarization rotating the received second polarized illumination light 12 from the second polarization state 2 to the first polarization state 1; and c) reflecting thus polarization rotated light, as a third polarized illumination light 13 in first polarization state 1, back to the PBS assembly 200, particularly to the second polarization beam splitting film 222, in opposition to the first direction 51. Then, the second polarization beams splitting film 222, in a second incident angle β with the first direction 51, reflects the received third polarized illumination light 13 in first polarization state 1 as a second polarization reflected light 22, in parallel to the first polarization reflected light 21, in first polarization state 1 and in the second direction 52 towards the reflective polarization modulation imager 110, particularly onto the second half facing area 112.

The second half facing area 112 of the reflective polarization modulation imager 110 is on aligned with the second polarization beam splitting film 222, for: a) receiving the second polarization reflected light 22 in the second direction 52; b) polarization modulating most or all of the second polarization reflected light 22 from first polarization state 1 to second polarization state 2; c) reflecting thus polarization modulated light, as a second modulated light 32 in second polarization state 2, back to the PBS assembly 200 and in particular, to the second polarization beam splitting film 222. And then the PBS assembly 200 transmits the second modulated light 32, with the first modulated light 31, in second polarization state 2 in opposition to the second direction 52 towards the projection lens system 300.

The first reflective quarter wave composite plate 120 may be provided with a first transmissive quarter waver plate 121 and a planar mirror 122 in parallel from front to back facing the PBS assembly 200. The first transmissive quarter waver plate 121 is disposed between the planar minor 122 and the PBS assembly 200. Those two component plates are selectively adhered into a stacking composite configuration.

Alternatively, the first polarization beam splitting film 221 and the second polarization beam splitting film 222 are either a multilayer polarizing beam splitting film or a wire grid polarizing plate, both providing the best reflection to transmission ratio at an incident angle close to 45-degree. Thus, the first incident angle α and the second incident angle β may be set equal or close to 45-degree and 135-degree respectively. In other words, the first polarization beam splitting film 221 and the second polarization beam splitting film 222 are orthogonal, i.e., β=α+90.

Through polarized illumination light components in both orthogonal states are utilized at improved percentage in this configuration, there would be certain difference in brightness or intensity between the illuminations received by the first half facing area 111 and the second half facing area 112. Particularly the second portion of illumination light 10 in second polarization state 2 would go through longer pass and optical components than the first portion in first polarization 1, before reaching the reflective polarization modulation imager 110. Thus, there may be a adjusting and balancing means for adjusting and balancing the overall brightness between the first modulated light 31 from the first half facing area 111 and the second modulated light 32 from the second half facing area 11. The adjusting and balancing means includes, but not limited to: 1) an output adjusting unit adapted to electrically instruct the reflective polarization modulation imager 110, upon measuring and calibrating, to adjust the light output between the two half facing areas; 2) an optical compensation unit adapted to add optical compensation, particularly light deduction on the first half facing area 111; 3) an intensity adjusting unit adapted to purposely reduce the intensity of the first portion of illumination light 10 in first polarization state 1 before inducing it to the PBS assembly 200; and 4) an angle adjusting unit adapted to lower the first incident angle α less than 45-degree and the second incident angle β less than 135-degree for expanding the projected area of the first half facing area 111 and reducing the one of the second half facing area 112 simultaneously and thus, balancing the illuminations onto the two projected areas.

Figure 4:
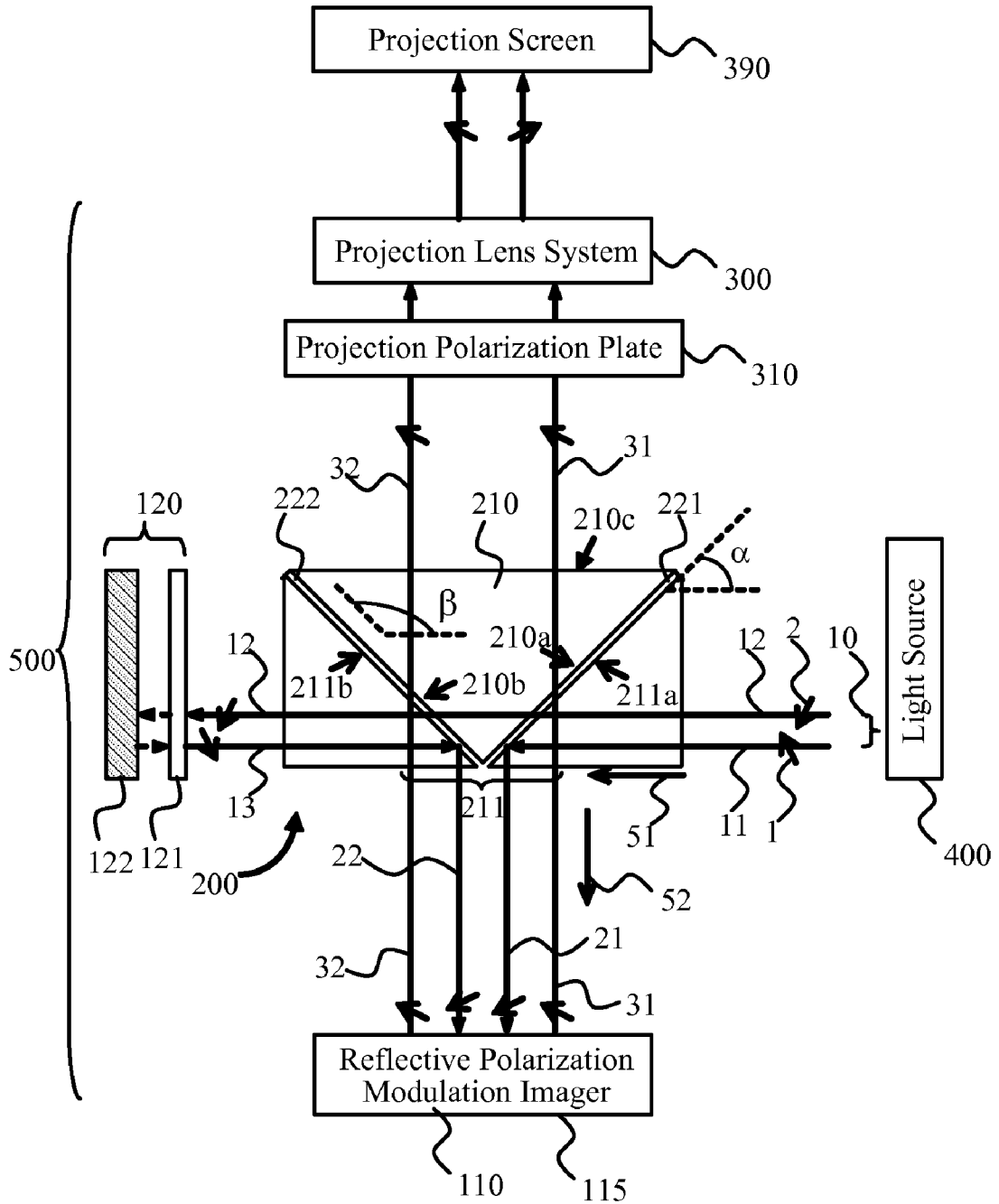
FIG. 4 is a schematic view of the single-imager projection engine assembly provided in Embodiment 2 of the present invention.

FIG. 4 shows partial cross section views of the single-imager projection engine assembly 500 provided in Embodiment 2 of the present invention. In this embodiment, the single-imager projection engine assembly 500 may further include a projection polarization plate 310 employed and configured between the projection lens system 300 and the PBS assembly 200. The projection polarization plate 310 receives and transmits the first modulated light 31 and the second modulated light 32 both in the second polarization state 2 to the projection lens system 300 and absorbs or back reflects light in first polarization state 1.

Besides, as shown in FIG. 4, the PBS assembly 200 may further include a first 3-sided prism 210 including a first side face 210*a*, a second side face 210*b* and a third side face 210*c*. The first polarization beam splitting film 221 and the second polarization beam splitting film 222 may be adequately configured at their preferred incident angles as attached onto the first side face 210*a* and the second side face 210*b* of a first 3-sided prism 210, respectively. In particular, a continuous multilayer polarization beam splitting film may be deposited onto the two faces of the first 3-sides prism 210 forming a 90-degree right angle, the first side face 210*a* and second side face 210*b*, while the third side face 210*c* of the first 3-sided prism 210 faces the projection lens system 300.

Similarly, the PBS assembly 200 may further include a first prism assembly 211 including a first V-notch side face 211*a* and a second V-notch side face 211*b*. The first polarization beam splitting film 221 and the second polarization beam splitting film 222 may also be adequately configured at their preferred incident angles as attached onto the first V-notch side face 211*a* and the second V-notch side face 211*b* in a concave configuration.

In another embodiment of the present invention, the first 3-sided prism 210 and the first prism assembly 211 may be used together. The first polarization beam splitting film 221 and the second polarization beam splitting film 222 may be sandwiched between the first 3-sided prism 210, on the first side face 210*a* and the second side face 210*b*, and the first prism assembly 211 on the first V-notch side face 211*a* and the second V-notch side face 211*b* to form the PBS assembly 200, in a more integrated assembly.

In the above configurations, even the reflective polarization modulation imager 110 and/or the reflective quarter waver composite plate 120 may be attached onto the PBS assembly 200.

In an optional embodiment of the present invention, liquid crystal on a silicon microdisplay panel 115 may be employed as the reflective polarization modulation imager 110, providing the needed spatial light modulation and reflection with 90-degree polarization rotation (FIG. 4). The reflective polarization modulation imager 110 may include a plurality of modulation imager pixels 105 regularly tiled in a planar array arrangement.

Figure 5:
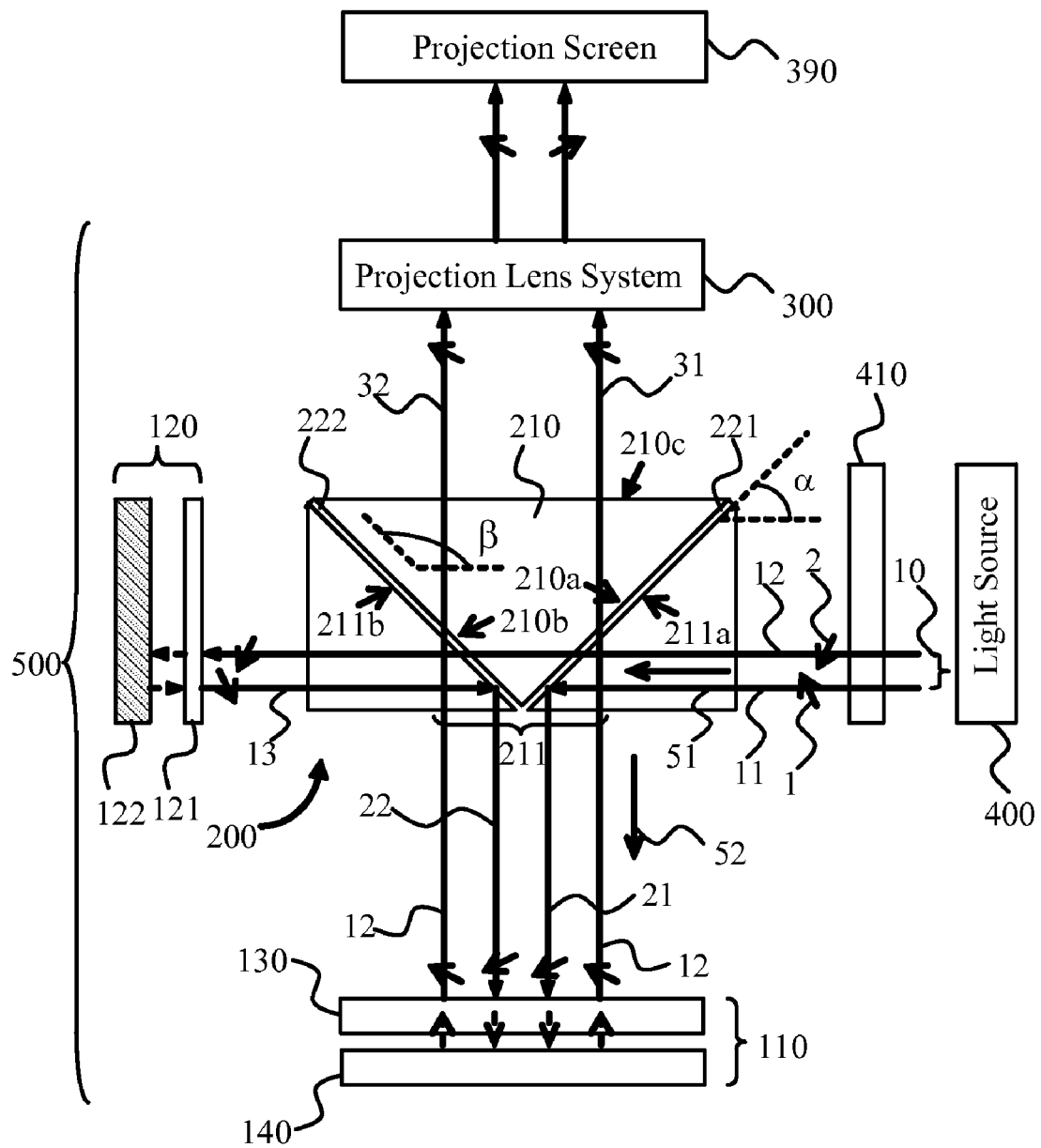
FIG. 5 is a schematic view of the single-imager projection engine assembly provided in Embodiment 3 of the present invention.
Figure 6:
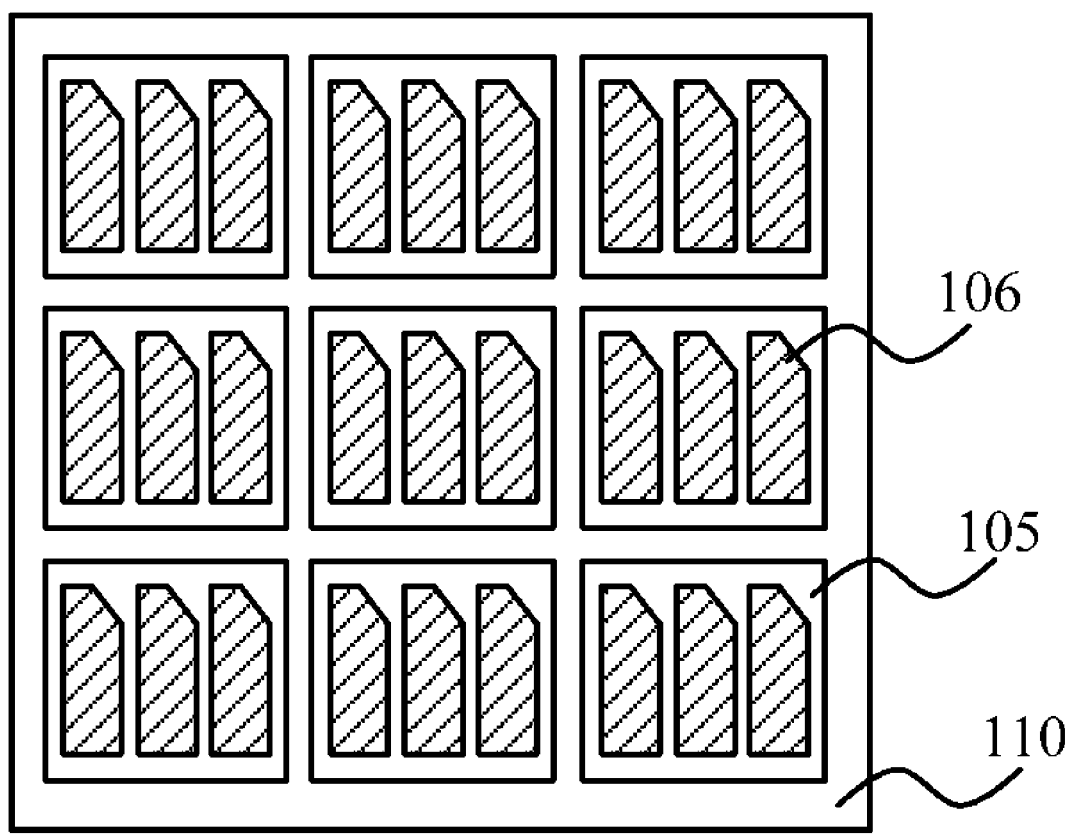
FIG. 6 is a schematic view of the color filter array provided in another extended embodiment of the present invention.

FIG. 5 is a schematic view of the single-imager projection engine assembly provided in Embodiment 3 of the present invention, and specifically is a cross-section view of the single-imager projection engine assembly 500. The light source 400 in the single-imager projection engine assembly 500 as disclosed and exemplified above can be any suitable light source including but not limited to conventional light sources such as, for example, arc lamps, tungsten lamps, halide lamps and the alike, and alternatives such as electromagnetic ballast, light emitting diodes and lasers. The light source 400 may be any one or any combination of the above light sources in any form.

In the present embodiment, a light conditioner 410 may be further placed between the light source 400 and the first polarization beam splitting film 221 for conditioning light emitted from the light source 400 as the combined, collimated illumination light 10 towards the PBS assembly 200 with improved collimation and brightness uniformity among others.

In the present embodiment, equivalent to the liquid crystal on the on a silicon microdisplay panel 115, the reflective polarization modulation imager 110 may further includes a second transmissive quarter wave plate 130 and a reflective intensity modulation imager panel 140 suffices the requirements as shown in FIG. 5.

In particular, the reflective intensity modulation imager panel 140 may simply include an array of micro electrical-mechanical interferometric pixels regularly tiled in a planar array arrangement in an extended embodiment.

In another extended embodiment, the reflective polarization modulation imager 110 may further provided with an overlapped thereon. Specifically, the color filter array 106 may be overlapped and aligned with a plurality of modulation imager pixels 105 for providing colorful projection beam.

The present invention should not be considered limited to the particular examples described above, but rather should be understood to cover all aspects of the invention as fairly set out in the attached claims. Various modifications, equivalent processes, as well as numerous structures to which the present disclosure may be applicable will be readily apparent to those of skill in the art to which the present disclosure is directed upon review of the instant specification.

What is claimed is:

1. A single-imager projection engine assembly, comprising:
   a light source adapted to induce illumination light in a first direction, the illumination light comprising a first polarized illumination light in a first polarization state and a second polarized illumination light in a second polarization state perpendicular to the first polarization state;
   a polarization beam splitter (PBS) assembly comprising:
   a first polarization beam splitting film adapted to receive the illumination light at a first incident angle, reflect the first polarized illumination light in the first polarization state as a first polarization reflected light in the first polarization state in a second direction, and transmit the second polarized illumination light in the second polarization state,
   a second polarization beam splitting film adapted to receive and transmit the second polarized illumination light in the second polarization state passing through the first polarization beam splitting film at a second incident angle; and
   a first 3-sided prism comprising a first side face, a second side face and a third side face, the first polarization beam splitting film and the second polarization beam splitting film are adherently attached to the first side face and the second side face while the third side face is facing the projection lens system;
   a reflective quarter wave composite plate adapted to reflect the second polarized illumination light in the second polarization state passing first through the first polarization beam splitting film and secondly through the second polarization beam splitting film, while the second polarized illumination light in the second polarization state is polarization rotating by 90 degree as a third polarization illumination light in the first polarization state in opposition to the first direction, wherein the second polarization beam splitting film receives and reflects the third polarization illumination light in the first polarization state as a second polarization reflected light in first polarization state in a second direction;
   a reflective polarization modulation imager, adapted to receive, 90-degree polarization modulate and reflect: the first polarization reflected light in the second direction as a first modulated light in the second polarization state, and the second polarization reflected light in the second direction as a second modulated light in the second polarization state; and
   a projection lens system adapted to receive and project the first modulated light and the second modulated light in opposition to the second direction.

2. The single-imager projection engine assembly according to claim 1, wherein the reflective quarter wave composite plate comprises a first transmissive quarter wave plate and a planar minor.

3. The single-imager projection engine assembly according to claim 1, further comprising a projection polarization plate, placed between a projection lens system and the PBS assembly, adapted to receive and transmit the first modulated light and the second modulated light in second polarization state towards the projection lens system while absorbing or back reflect light in the first polarization state.

4. The single-imager projection engine assembly according to claim 1, wherein the reflective polarization modulation imager is a liquid crystal on a silicon microdisplay panel.

5. The single-imager projection engine assembly according to claim 1, wherein the reflective polarization modulation imager comprises a plurality of modulation imager pixels regularly tiled in a planar array arrangement.

6. The single-imager projection engine assembly according to claim 1, wherein the reflective polarization modulation imager comprises a second transmissive quarter wave plate and a reflective intensity modulation imager panel.

7. The single-imager projection engine assembly according to claim 6, wherein the reflective intensity modulation imager panel comprises an array of micro electrical-mechanical interferometric pixels regularly tiled in a planar array arrangement.

8. The single-imager projection engine assembly according to claim 1, wherein the PBS assembly further comprises a first prism assembly comprising a first prism assembly comprising a first V-notch side face and a second V-notch side face, the first polarization beam splitting film and the second polarization beam splitting film are sandwiched between the first side face and the second side face, as well as the first V-notch side face and the second V-notch side face to form the PBS assembly.

9. The single-imager projection engine assembly according to claim 1, further comprising a color filter array overlapped on the reflective polarization modulation imager.

10. The single-imager projection engine assembly according to claim 9, wherein the reflective polarization modulation imager comprises a plurality of modulation imager pixels regularly tiled in a planar array arrangement, the color filter array is aligned and overlapped with the plurality of modulation imager pixels.

11. The single-imager projection engine assembly according to claim 1, further comprising a light conditioner adapted to condition light emitted from the light source as combined, collimated illumination of the illumination light towards the PBS assembly.

12. The single-imager projection engine assembly according to claim 1, wherein the light source is any one or combination of an arc lamp, a tungsten lamp, a halide lamp, electromagnetic ballast, a light emitting diode and a laser.

13. The single-imager projection engine assembly according to claim 1, further comprising a adjusting and balancing device adapted to adjust and balance brightness of the first modulated light and the second modulated light from the reflective polarization modulation imager.

14. The single-imager projection engine assembly according to claim 13, wherein the adjusting and balancing device comprises an angle adjusting unit adapted to lower the first incident angle less than 45-degree and the second incident angle than 135-degree.

15. The single-imager projection engine assembly according to claim 13, wherein the reflective polarization modulation imager comprises a first half facing area adapted to reflect the first modulated light and a second half facing area adapted to reflect the second modulated light; and the adjusting and balancing device comprises an output adjusting unit adapted to electronically instruct the reflective polarization modulation imager based on measuring and calibrating, to adjust and balance light outputs between the first half facing area and the second half facing area.

16. The single-imager projection engine assembly according to claim 13, wherein the reflective polarization modulation imager comprises a first half facing area adapted to reflect the first modulated light and a second half facing area adapted to reflect the second modulated light; and the adjusting and balancing device comprises an optical compensation unit on the first half facing area adapted to perform light deduction by applying optical compensation.

17. The single-imager projection engine assembly according to claim 1, wherein the first incident angle equals to 45-degree and the second incident angle equals to the first incident angle plus 90 degree.

18. The single-imager projection engine assembly according to claim 1, wherein the first polarization beam splitting film and the second polarization beam splitting film are either a multilayer polarizing beam splitting film or a wire grid polarizing plate.

19. A single-imager projection engine assembly, comprising:
- a light source adapted to induce illumination light in a first direction, the illumination light comprising a first polarized illumination light in a first polarization state and a second polarized illumination light in a second polarization state perpendicular to the first polarization state;
- a polarization beam splitter (PBS) assembly comprising:
- a first polarization beam splitting film adapted to receive the illumination light at a first incident angle, reflect the first polarized illumination light in the first polarization state as a first polarization reflected light in the first polarization state in a second direction, and transmit the second polarized illumination light in the second polarization state,
- a second polarization beam splitting film adapted to receive and transmit the second polarized illumination light in the second polarization state passing through the first polarization beam splitting film at a second incident angle; and
- a first prism assembly comprising a first V-notch side face and a second V-notch side face in concave configuration, wherein the first polarization beam splitting film and the second polarization beam splitting film are adherently attached to the first V-notch side face and the second V-notch side face, respectively;
- a reflective quarter wave composite plate adapted to reflect the second polarized illumination light in the second polarization state passing first through the first polarization beam splitting film and secondly through the second polarization beam splitting film, while the second polarized illumination light in the second polarization state is polarization rotating by 90 degree as a third polarization illumination light in the first polarization state in opposition to the first direction, wherein the second polarization beam splitting film receives and reflects the third polarization illumination light in the first polarization state as a second polarization reflected light in first polarization state in a second direction;
- a reflective polarization modulation imager, adapted to receive, 90-degree polarization modulate and reflect: the first polarization reflected light in the second direction as a first modulated light in the second polarization state, and the second polarization reflected light in the second direction as a second modulated light in the second polarization state; and
- a projection lens system adapted to receive and project the first modulated light and the second modulated light in opposition to the second direction.

20. The single-imager projection engine assembly according to claim 19, wherein the reflective quarter wave composite plate comprises a first transmissive quarter wave plate and a planar minor.

* * * * *